(12) United States Patent
Liao

(10) Patent No.: US 11,654,964 B2
(45) Date of Patent: May 23, 2023

(54) VEHICLE

(71) Applicant: KWANG YANG MOTOR CO., LTD., Kaohsiung (TW)

(72) Inventor: Wei-Xiang Liao, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 17/850,610

(22) Filed: Jun. 27, 2022

(65) Prior Publication Data

US 2022/0410970 A1 Dec. 29, 2022

(30) Foreign Application Priority Data

Jun. 28, 2021 (TW) .................................. 110123636

(51) Int. Cl.
*B62D 9/02* (2006.01)
(52) U.S. Cl.
CPC ...................................... *B62D 9/02* (2013.01)
(58) Field of Classification Search
CPC .............. B62K 5/027; B62K 2025/047; B60G 2300/122; B60G 17/005; B60G 17/017; B60G 2204/45; B62L 1/00; B62D 9/02; B62D 9/04
USPC ...................................... 180/76; 280/124.103
See application file for complete search history.

(56) References Cited

U.S. PATENT DOCUMENTS

| | | | |
|---|---|---|---|
| 7,264,251 B2 * | 9/2007 | Marcacci | B60G 17/017 280/5.506 |
| 7,460,026 B2 * | 12/2008 | Hanahara | B60H 1/00642 340/8.1 |
| 9,187,037 B2 * | 11/2015 | Watanabe | B60Q 1/44 |
| 10,086,901 B2 * | 10/2018 | Shibuya | B62K 5/08 |
| 10,486,713 B2 * | 11/2019 | Shah | B60W 50/0205 |
| 2009/0299565 A1 * | 12/2009 | Hara | B60G 21/007 701/31.4 |
| 2011/0257841 A1 * | 10/2011 | Hara | B62K 25/04 701/37 |

FOREIGN PATENT DOCUMENTS

| | | |
|---|---|---|
| EP | 3321158 | 5/2018 |
| EP | 3434570 | 1/2019 |
| TW | I346055 | 8/2011 |

* cited by examiner

*Primary Examiner* — Paul N Dickson
*Assistant Examiner* — Caitlin Anne Miller
(74) *Attorney, Agent, or Firm* — Burris Law, PLLC

(57) ABSTRACT

A vehicle includes a control switch that is configured to generate an operation signal, and a controller that is electrically connected to the control switch to receive the operation signal therefrom, and that is configured to, in response to receipt of the operation signal, transmit a control signal to a tilting mechanism for making the tilting mechanism operate in one of a locked state and an unlocked state. After the vehicle is powered on, the controller is further configured to, when the controller has continuously received the operation signal for a predetermined reception time, determine that the control switch is abnormal, stop transmitting the control signal and control a warning unit to output a warning signal.

17 Claims, 9 Drawing Sheets

VEHICLE

CROSS-REFERENCE TO RELATED APPLICATION

This application claims priority of Taiwanese Patent Application No. 110123636, filed on Jun. 28, 2021.

FIELD

The disclosure relates to a vehicle, more particularly to a motorcycle with two front wheels.

BACKGROUND

A conventional motorcycle usually has a front wheel and a rear wheel in a longitudinal direction of the motorcycle. Accordingly, the motorcycle has advantages of having relatively greater maneuverability and lighter weight. However, it may be difficult to balance the motorcycle, so a rider's skills are relied upon to prevent the motorcycle from tipping when riding or parking the motorcycle. More particularly, when moving the motorcycle backward from a parking area where other vehicles are parked close-by, it is usually difficult to balance the motorcycle because there is not enough room to apply the necessary force.

Therefore, Taiwanese Patent No. I346055 provides a three-wheeled motorcycle. The three-wheeled motorcycle includes two front wheels that are spaced from each other in a lateral direction of the three-wheeled motorcycle, and a connecting rod that is configured to control movements of the front wheels to tilt the three-wheeled motorcycle so as to provide the three-wheeled motorcycle with the ability to turn. However, if tilting of the three-wheeled motorcycle is permitted at all times, the same problem as with the conventional two-wheeled motorcycle of having difficulty balancing when parking exists. Therefore, most three-wheeled motorcycles further include a locking switch and an unlocking switch that are mounted on a handlebar and that allow the rider to control the connecting rod according to his or her needs, thereby giving the rider control over whether the three-wheeled motorcycle is able to tilt or not.

However, when fails or becomes damaged, the locking switch or the unlocking switch may cause the connecting rod to be controlled incorrectly. For example, when the unlocking switch is stuck at the turn-on position or has a short circuit before the rider starts the three-wheeled motorcycle, the unlocking switch would generate a signal to unlock the connecting rod and the three-wheeled motorcycle may tilt immediately after being powered on, and an accident may occur if the rider fails to react in time and balance the three-wheeled motorcycle. Similarly, the three-wheeled motorcycle would be unable to tilt when the locking switch is stuck at the turn-on position or has a short circuit, making it difficult for the rider to maneuver the three-wheeled motorcycle, and putting the rider at risk if the rider decides to ride the three-wheeled motorcycle regardless of the failure of the locking switch.

SUMMARY

Therefore, an object of the disclosure is to provide a vehicle that can alleviate at least one of the drawbacks of the prior art.

According to one embodiment of the disclosure, the vehicle includes a tilting mechanism, two front wheels, a control switch, a controller, and a warning unit.

The front wheels are on two lateral sides of the tilting mechanism and are spaced apart from each other in a lateral direction of the vehicle. The tilting mechanism is configured to allow the two front wheels to tilt.

The control switch is operable to generate an operation signal.

The controller is electrically connected to the control switch to receive the operation signal therefrom, and is electrically connected to the tilting mechanism and the warning unit to control operations thereof. The controller is configured to, in response to receipt of the operation signal, transmit a control signal to the tilting mechanism for making the tilting mechanism operate in one of an unlocked state and a locked state.

After the vehicle is powered on, the controller is further configured to, when the controller has continuously received the operation signal for a predetermined reception time period, determine that the control switch is abnormal, stop transmitting the control signal to the tilting mechanism and control the warning unit to output a warning signal.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
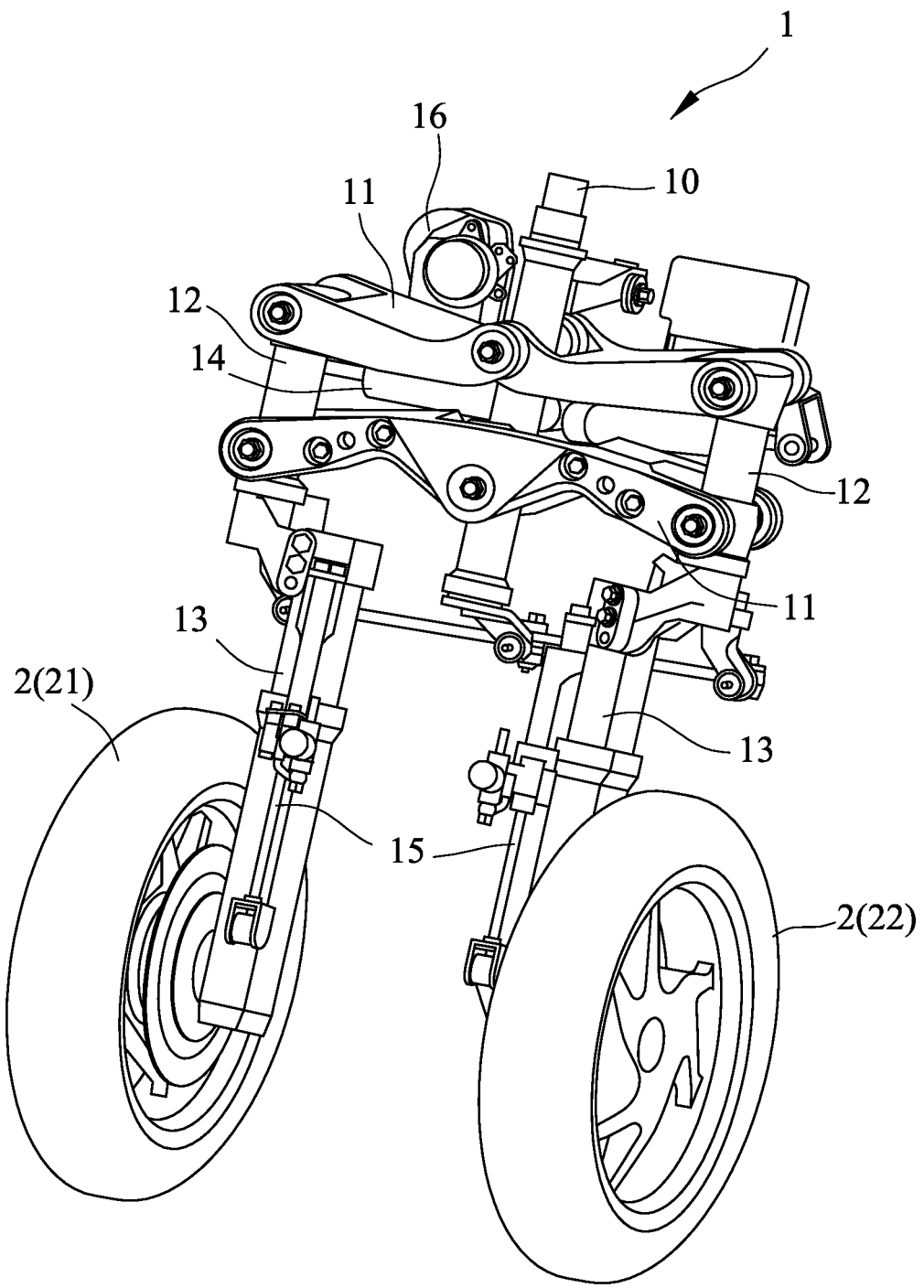
FIG. 1 is a perspective view illustrating a tilting mechanism of a vehicle according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
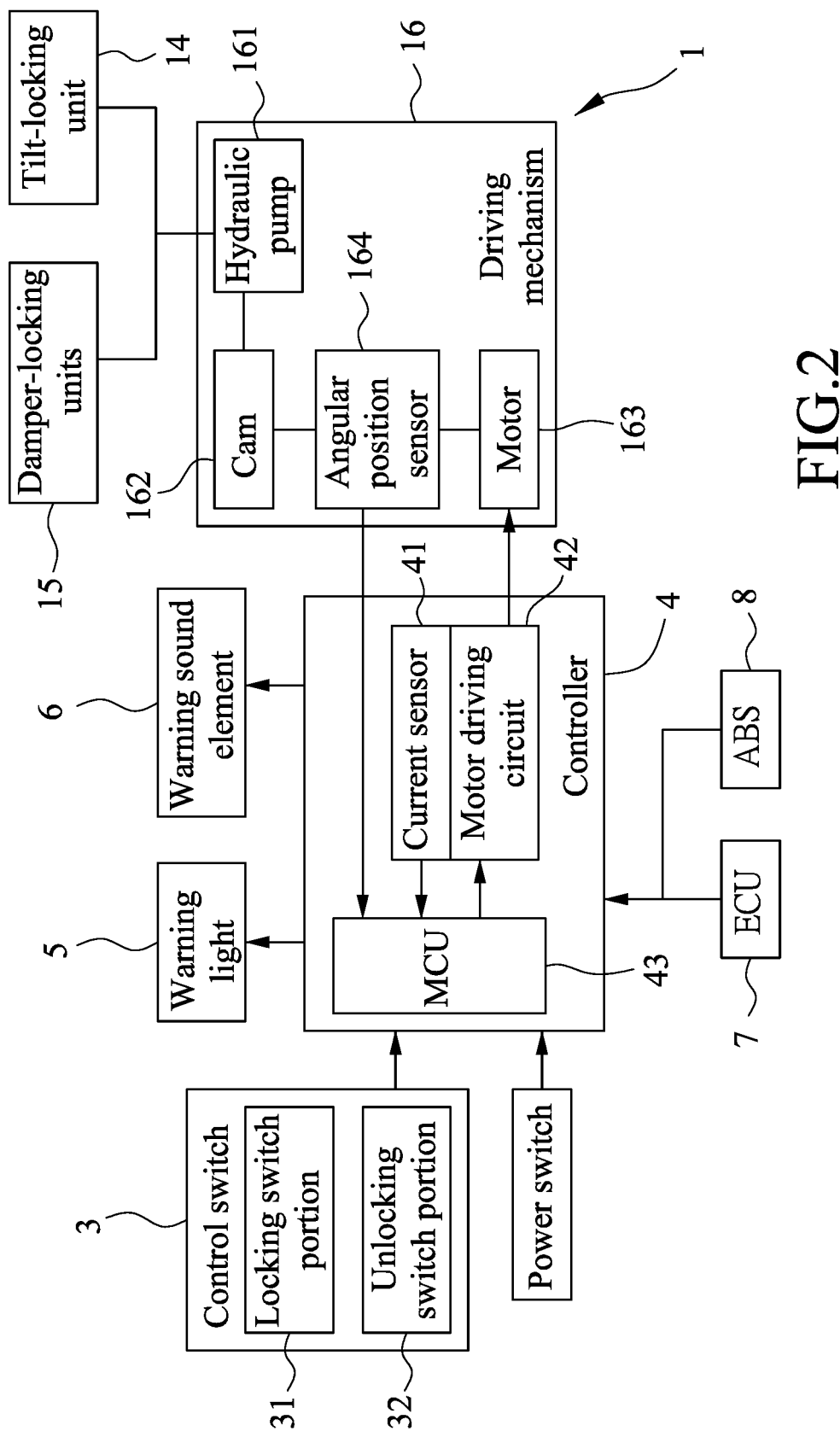
FIG. 2 is a block diagram illustrating some components of the vehicle according an embodiment of the disclosure.

Referring to FIGS. 1 and 2, according to a first embodiment of the disclosure, a vehicle includes a vehicle frame 10, a tilting mechanism 1 that is mounted on the vehicle frame 10, two front wheels 2 (i.e., a right front wheel 21 and a left front wheel 22) that are disposed on two lateral sides of the tilting mechanism 1 and that are spaced apart from each other in a lateral direction of the vehicle (i.e., a left-right direction), a control switch 3 that is operable to generate an operation signal only when the control switch 3 is actuated by a user, a controller 4 that is configured to, in response to receipt of the operation signal, transmit a control signal to the tilting mechanism 1, a warning unit, an engine control unit (ECU) 7, an anti-lock braking system (ABS) 8, and an engine (not shown). For example, the vehicle is a three-wheeled motorcycle, and the user may be a rider of the three-wheeled motorcycle.

The tilting mechanism 1 is configured to allow the two front wheels 2 to tilt. The tilting mechanism 1 is electrically connected to the controller 4 for receiving the control signal therefrom, and is configured to, in response to receipt of the control signal, operate in one of an unlocked state where the tilting mechanism 1 allows movement of the front wheels 2 relative to the vehicle frame 10 so as to make the vehicle able to tilt, and a locked state where the tilting mechanism 1 restricts the movement of the front wheels 2. More specifically, the tilting mechanism 1 includes two transverse bars 11 that are spaced apart from each other in an up-down direction of the vehicle, two lateral bars 12 that are spaced apart from each other in the left-right direction of the vehicle and that are pivotally connected to the transverse bars 11, two dampers 13 that are respectively connected to the lateral bars 12, a tilt-locking unit 14 that is connected to the transverse bars 11, two damper-locking units 15 that are mounted respectively on the dampers 13, and a driving mechanism 16 that is configured to drive the tilt-locking unit 14 and damper-locking units 15. The front wheels 2 are mounted respectively on the dampers 13.

The transverse bars 11 and the lateral bars 12 form a linkage mechanism. When the lateral bars 12 tilt left or right with respect to the transverse bars 11, the dampers 13 and the front wheels 2 are driven to move with respect to the vehicle frame 10, such that the front wheels 2 and the vehicle tilt with respect to ground.

The tilt-locking unit 14 is configured to be driven to allow or restrict movement of the lateral bars 12 with respect to the transverse bars 11. In the first embodiment, the tilt-locking unit 14 is a hydraulic cylinder that is connected to the lateral bars 12. The tilt-locking unit 14 is powered by pressurized oil to restrict the movement of the lateral bars 12. On the other hand, when the oil in the tilt-locking unit 14 is not pressurized, the movement of the lateral bars 12 is allowed and the vehicle is able to tilt.

The damper-locking units 15 are configured to be driven to respectively lock or unlock the dampers 13. The damper-locking units 15 lock the dampers 13 to restrict vertical movement (i.e., expansion and contraction) of the dampers 13 such that the front wheels 2 mounted on the dampers 13 cannot move with the dampers 13. On the other hand, when the damper-locking units 15 unlock the dampers 13, the vertical movement of the dampers 13 is allowed, and the front wheels 2 can move with the dampers 13 in the vertical direction such that the vehicle is capable of tilting.

The driving mechanism 16 is electrically connected to the controller 4 for receiving the control signal therefrom, and is configured to, in response to receipt of the control signal, drive the tilt-locking unit 14 and the damper-locking units 15 to make the tilting mechanism 1 operate in one of the locked state and the unlocked state. The driving mechanism 16 includes a hydraulic pump 161 that is configured to drive the tilt-locking unit 14 and the damper-locking units 15 (e.g., by providing hydraulic pressure thereto), a cam 162 that is configured to be driven to drive the hydraulic pump 161, and a motor 163 that is connected to the cam 162 and that is electrically connected to the controller 4 for receiving the control signal from the controller 4 and drive the cam 162 based on the control signal. The motor 163 drives the cam 162, and then the cam 162 drives the hydraulic pump 161 to make the oil pressure increase or decrease in order to drive the tilt-locking unit 14 and the damper-locking units 15.

When the driving mechanism 16 drives the tilt-locking unit 14 to restrict the movement of the lateral bars 12 and drives the damper-locking units 15 to lock the dampers 13, the movement of the front wheels 2 is restricted so as to make the tilting mechanism 1 operate in the locked state. On the other hand, when the driving mechanism 16 drives the tilt-locking 14 to allow the movement of the lateral bars 12 or drives one or both of the damper-locking units 15 to unlock the dampers 13, the movement of the front wheels 2 is allowed so as to make the tilting mechanism 1 operate in the unlocked state.

For further details of the tilting mechanism 1, the tilt-locking unit 14 and the damper-locking units 15, please refer to publications of European Patent Publication Nos. EP3434570A1 and EP3321158A1.

Figure 3:
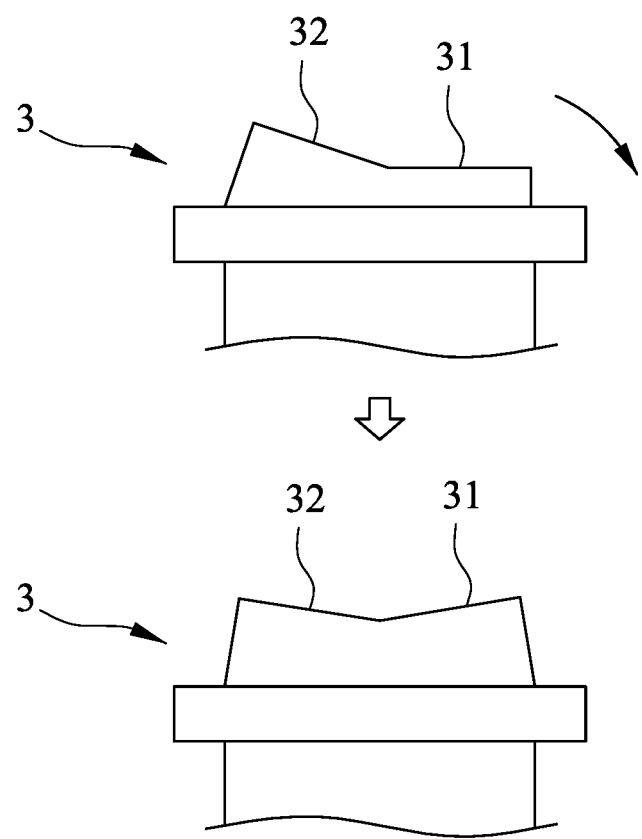
FIG. 3 is a schematic diagram illustrating a control switch of the vehicle according to an embodiment of the disclosure.
Figure 4:
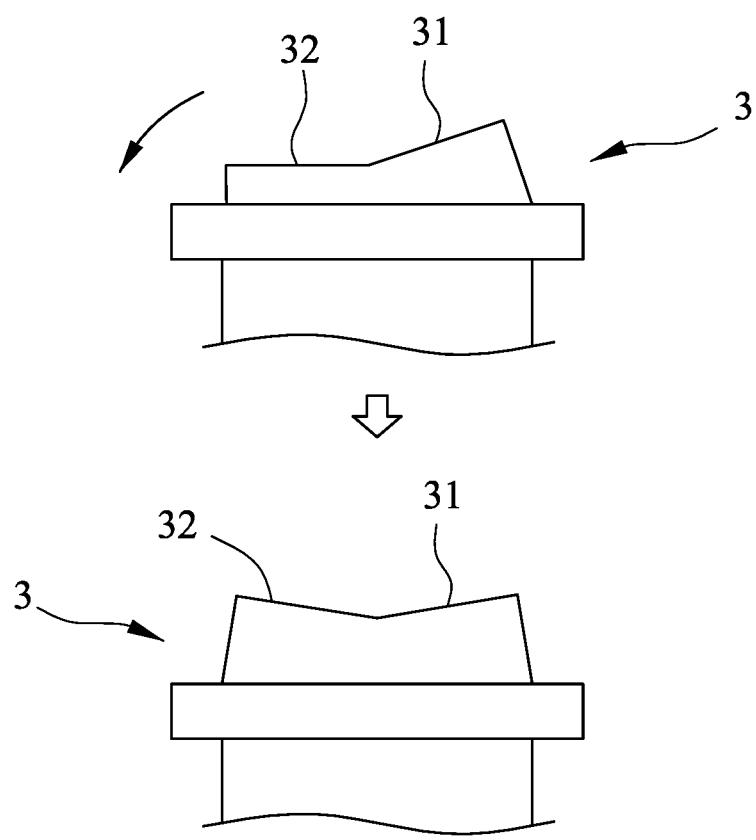
FIG. 4 is a schematic diagram illustrating the control switch of the vehicle according to an embodiment of the disclosure.

Further referring to FIGS. 3 and 4, the control switch 3 is mounted on a handlebar (not shown) of the vehicle for the user to operate to generate the operation signal, and is configured to automatically return to a default position immediately after the control switch 3 is released, wherein at the default position, the control switch 3 does not generate the operation signal. The control switch 3 includes a locking switch portion 31 and an unlocking switch portion 32. The control switch 3 is configured to generate an unlocking signal as the operation signal when the unlocking switch portion 32 is pressed by the user (see FIG. 4), and to generate a locking signal as the operation signal when the locking switch portion 31 is pressed by the user (see FIG. 3). In the first embodiment, the control switch 3 is a push switch, and the locking switch portion 31 and the unlocking switch portion 32 are connected to each other (i.e., formed as one piece) and move together (as shown in FIGS. 3 and 4). In some embodiments, the locking switch portion 31 and the unlocking switch portion 32 may be two separate switches that do not move together according to requirements.

The controller 4 is electrically connected to the control switch 3 to receive the operation signal therefrom, is electrically connected to the tilting mechanism 1 and the warning unit to control operations thereof, and is configured to, in response to receipt of the operation signal, transmit the control signal to the tilting mechanism 1 in order to make the tilting mechanism 1 operate in one of the locked state and the unlocked state. More specifically, in response to receipt of the unlocking signal, the controller 4 is configured to transmit the control signal to the tilting mechanism 1 for making the tilting mechanism 1 operate in the unlocked state; in response to receipt of the locking signal, the controller 4 is configured to transmit the control signal to the tilting mechanism 1 for making the tilting mechanism 1 operate in the locked state.

In the first embodiment, the controller 4 includes a current sensor 41 configured to detect a current value of electric current flowing through the motor 163, a motor driving circuit 42 configured to control operation of the motor 163, and a microcontroller unit (MCU) 43. The MCU 43 is configured to determine whether the current value is greater than a threshold value, and to determine that the motor 163 is stalled when the current value is greater than the threshold value. The driving mechanism 16 further includes an angular position sensor 164 (e.g., a camshaft position sensor) configured to detect a current angular position of the cam 162 and to output the current angular position to the MCU 43, and the MCU 43 is configured to determine, based on the current angular position received from the angular position sensor 164, whether the cam 162 has rotated to a correct position, so as to determine whether the tilting mechanism 1 is in the locked state or the unlocked state.

The warning unit is configured to output a warning signal. In this embodiment, the warning unit includes a warning light 5 and a warning sound element 6.

The ECU 7 is electrically connected to an engine speed sensor (not shown) that is for detecting an engine speed of the engine, and receives the engine speed from the engine speed sensor, and is electrically connected to the controller 4 via a communication interface (not shown) to transmit the engine speed to the controller 4.

The ABS 8 is electrically connected to a vehicle speed sensor (not shown) that is for detecting a vehicle speed of the vehicle, and receives the vehicle speed from the vehicle speed sensor, and is electrically connected to the controller 4 via a communication interface (not shown) to transmit the vehicle speed to the controller 4.

Figure 5:
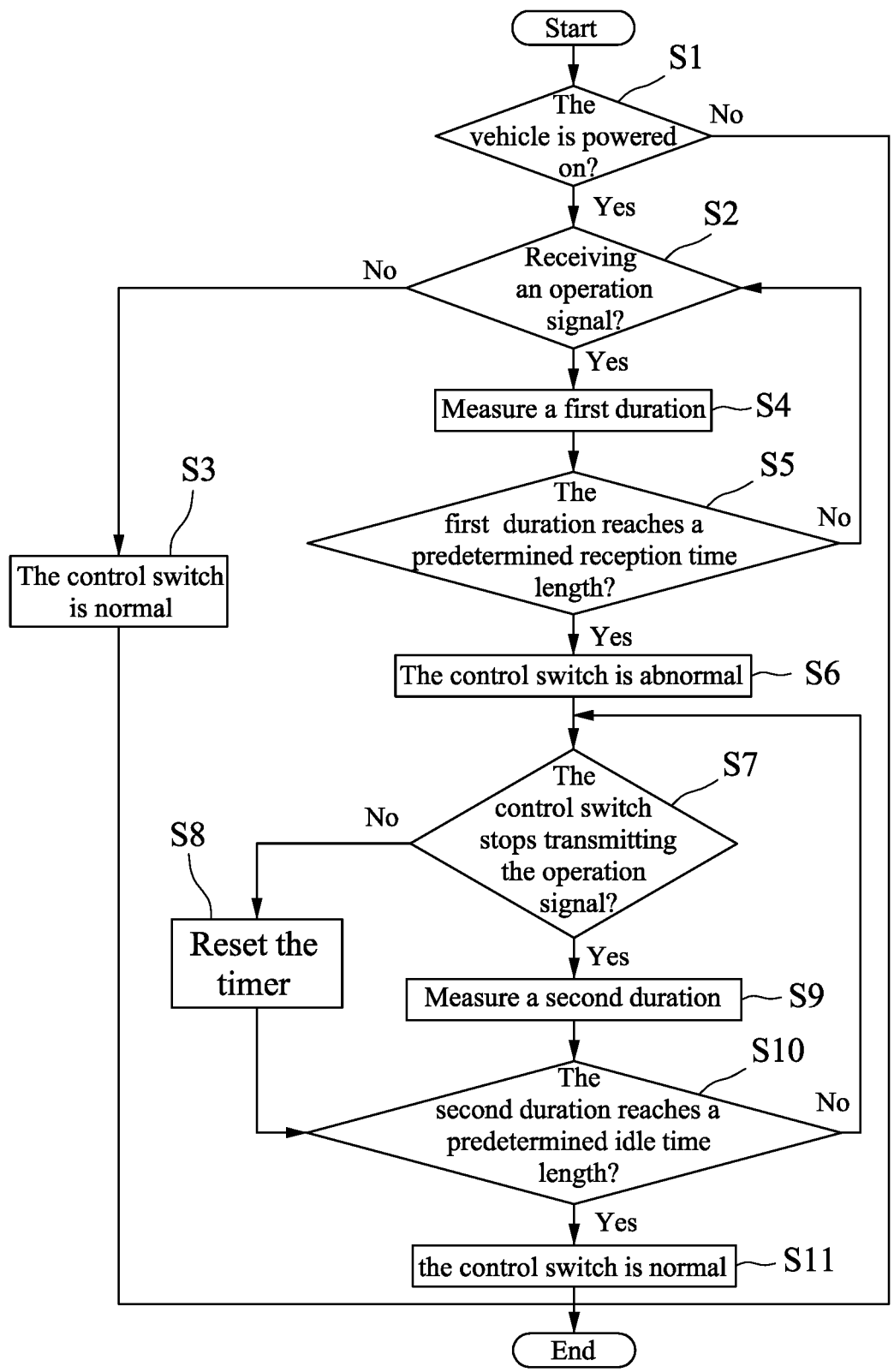
FIG. 5 is a flow chart illustrating a procedure of detecting a state of the control switch according to an embodiment of the disclosure.

Referring to FIGS. 2 and 5, according to the first embodiment of the disclosure, a switch-detecting procedure for detecting a state of the control switch 3 is executed by the controller 4. The switch-detecting procedure includes step S1 to step S11.

In step S1, the controller 4 determines whether the vehicle is powered on. When it is determined that the vehicle is powered on, the flow goes to step S2; otherwise, the flow is terminated.

When it is determined that the vehicle is powered on, in step S2, the controller 4 determines whether the controller 4 is receiving the operation signal from the control switch 3. When it is determined that the controller 4 is receiving the operation signal, the flow goes to step S4; otherwise, the flow goes to step S3.

When it is determined that the controller 4 is not receiving the operation signal, in step S3, the controller 4 determines that the control switch 3 is normal, and then the flow is terminated.

When it is determined that the controller 4 is receiving the operation signal from the control switch 3, in step S4, the controller 4 starts a timer for measuring a duration, in which the controller 4 continuously receives the operation signal (hereinafter referred to as "first duration"). The timer may be implemented as a software program.

In step S5, the controller 4 determines whether the first duration reaches time length of a predetermined reception time period (hereinafter referred to as "predetermined reception time length"). When it is determined that the first duration reaches the predetermined reception time length, the flow goes to step S6; otherwise, the flow goes to step S2. In the first embodiment, the predetermined reception time length is 0.5 seconds, but not limited thereto. It should be noted that when the determination made in step S5 is negative and the flow goes back to step S2, the timer continues to measure the first duration until the first duration reaches the predetermined reception time length.

In step S6, the controller 4 determines that the control switch 3 is abnormal. When it is determined that the control switch 3 is abnormal, the controller 4 further executes a first troubleshooting-advising procedure shown in FIG. 6 if the operation signal is the locking signal or executes a second troubleshooting-advising procedure shown in FIG. 7 if the operation signal is the unlocking signal. That is to say, at this time, a circuit of the control switch 3 may be shorted or the control switch 3 may be incapable of automatically returning to the default position such that the operation signal is continuously being transmitted. Details of the first and second troubleshooting-advising procedures will described after description of the switch-detecting procedure of FIG. 5.

In step S7, the controller 4 determines whether the control switch 3 stops transmitting the operation signal. When it is determined that the control switch 3 stops transmitting the operation signal, the flow goes to step S9; otherwise, the flow goes to step S8.

When it is determined that the control switch 3 is still transmitting the operation signal, in step S8, the controller 4 resets the timer to zero. Then, the flow goes to step S10.

In step S9, the controller 4 starts the timer for measuring a duration, in which the control switch 3 has stopped transmitting the operation signal (hereinafter referred to as "second duration").

In step S10, the controller 4 determines whether the second duration reaches time length of a predetermined idle time period (hereinafter referred to as "predetermined idle time length"). When it is determined that the second duration reaches the predetermined idle time length, the flow goes to step S11; otherwise, the flow goes back to step S7. In the first embodiment, the predetermined idle time length is 0.5 seconds, but not limited thereto. It should be noted that when the determination made in step S10 is negative and the flow goes back to step S7, the timer continues to measure the second duration until the second duration reaches the predetermined idle time length.

When it is determined that the second duration reaches the predetermined idle time length, in step S11, the controller 4 determines that the control switch 3 has returned to normal. When it is determined that the control switch 3 has returned to normal, the controller 4 further executes one of the first troubleshooting-advising procedure and the second troubleshooting-advising procedure. That is to say, at this time, the control switch 3 may have been fixed such that the control switch 3 stops continuously transmitting the operation signal.

Figure 6:
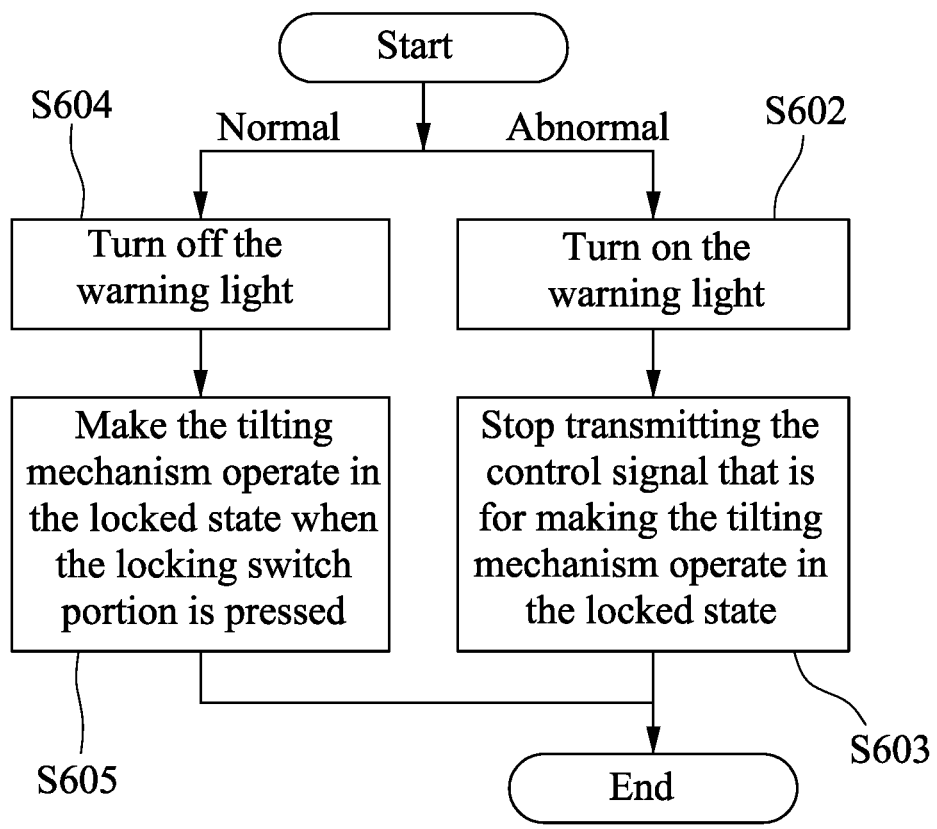
FIG. 6 is a flow chart of a troubleshooting-advising procedure for dealing with an abnormal state of a locking switch portion of the control switch according to an embodiment of the disclosure.

Referring to FIG. 6, an example of the first troubleshooting-advising procedure for dealing with an abnormal state of the control switch 3 is provided. The first troubleshooting-advising procedure includes step S602 to step S605, and is implemented when the operation signal is the locking signal (i.e., the locking switch portion 31 is stuck at the pressed position).

When it is determined in step S6 that the control switch 3 is abnormal, the flow goes to step S602; when it is determined in step S11 that the control switch 3 has returned to normal, the flow goes to step S604.

In step S602, the controller 4 turns on the warning light 5 to emit light as the warning signal to notify the user of the abnormal state of the control switch 3.

In step S603, the controller 4 stops transmitting to the tilting mechanism 1 the control signal that is for making the tilting mechanism 1 operate in the locked state. It should be noted that, in this troubleshooting procedure, the controller 4 is still able to transmit, in response to the unlocking signal which serves as the operation signal, the control signal to the tilting mechanism 1 for making the mechanism 1 operate in the unlocked state.

It should be noted that steps S602 and S603 are not implemented in any specific order and may be implemented at the same time.

In step S604, the controller 4 turns off the warning light 5.

In step S605, the controller 4 is configured to transmit the control signal to the tilting mechanism 1 for making the tilting mechanism 1 operate in the locked state when the locking switch portion 31 of the control 3 is pressed.

It should be noted that steps S604 and S605 are not implemented in any specific order and may be implemented at the same time.

Figure 7:
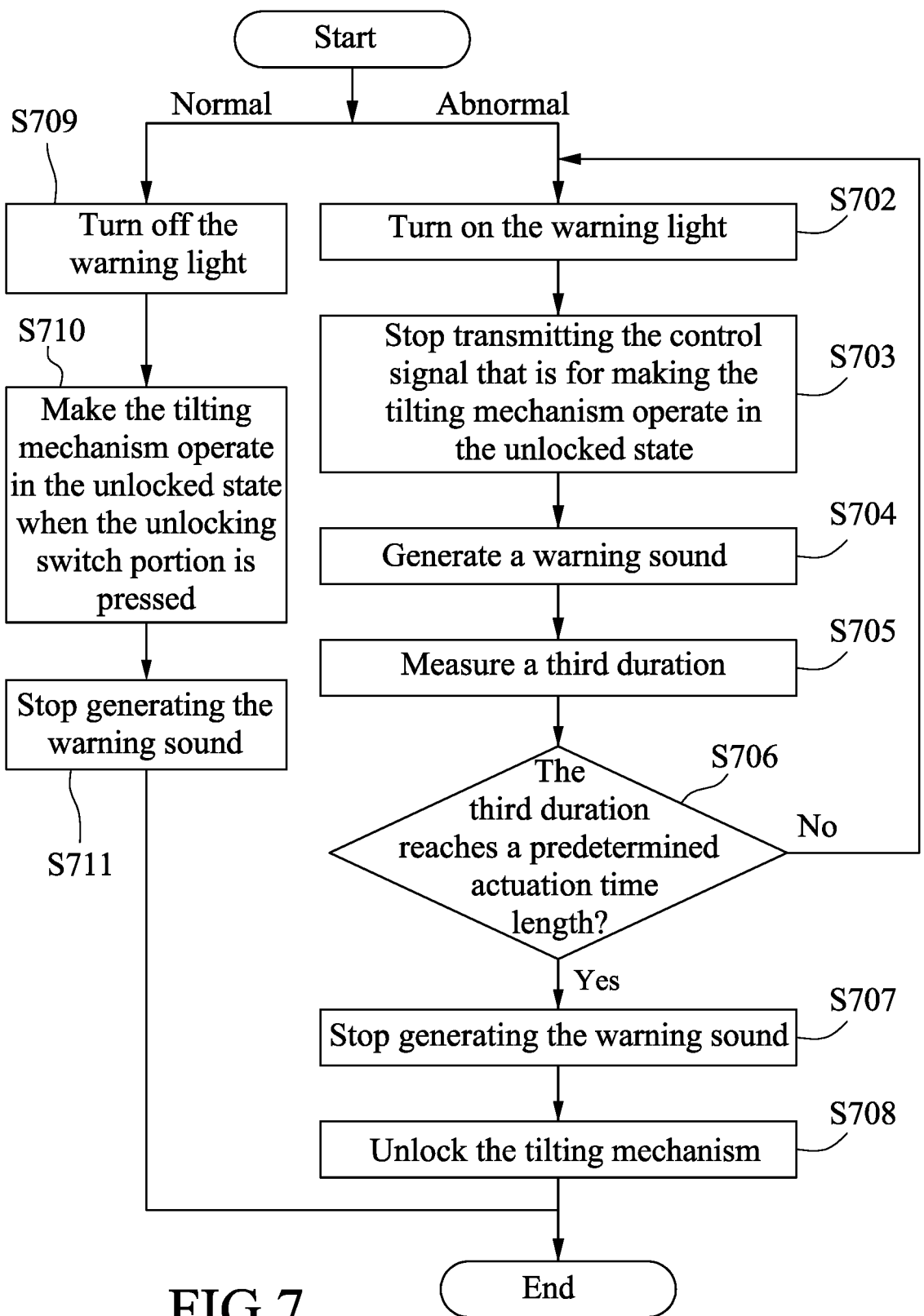
FIG. 7 is a flow chart of another troubleshooting-advising procedure for dealing with an abnormal state of an unlocking switch portion of the control switch according to an embodiment of the disclosure.

Referring to FIG. 7, an example of the second troubleshooting-advising procedure for dealing with an abnormal state of the control switch 3 is provided. The second troubleshooting-advising procedure includes step S702 to step S711, and is implemented when the operation signal is the unlocking signal (i.e., the unlocking switch portion 32 is stuck at the pressed position).

When it is determined in step S6 that the control switch 3 is abnormal, the flow goes to step S702; when it is determined in step S11 that the control switch 3 has returned to normal, the flow goes to step S709. In step S702, the controller 4 turns on the warning light 5 to emit light as the warning signal to notify the user of the abnormal state of the control switch 3.

In step S703, the controller 4 stops transmitting to the tilting mechanism 1 the control signal that is for making the tilting mechanism 1 operate in the unlocked state. It should be noted that, in this troubleshooting-advising procedure, the controller 4 is still able to transmit, in response to the locking signal which serves as the operation signal, the control signal to the tilting mechanism 1 for making the tilting mechanism 1 operate in the locked state.

In step S704, the controller 4 controls the warning sound element 6 to generate a warning sound as the warning signal to further notify the user of the abnormal state. In the first embodiment, the warning sound element 6 is a buzzer.

In step S705, the controller 4 starts the timer for measuring a duration, in which the warning sound is generated (hereinafter referred to as "third duration").

It should be noted that steps S702 to S705 are not implemented in any specific order and may be implemented at the same time.

In step S706, the controller 4 determines whether the third duration reaches time length of a predetermined actuation time period (hereinafter referred to as "predetermined actuation time length"). When it is determined that the third duration reaches the predetermined actuation time length, the flow goes to step S707; otherwise, the flow goes to step S702. In the first embodiment, the predetermined actuation time length is 6 seconds. It should be noted that when the determination made in step S706 is negative and the flow goes back to step S702, the timer continues to measure the third duration until the third duration reaches the predetermined actuation time length.

When it is determined that the third duration reaches the predetermined actuation time length, in step S707, the controller 4 controls the warning sound element 6 to stop generating the warning sound.

In step S708, the controller 4 transmits the control signal to the tilting mechanism 1 for making the tilting mechanism 1 operate in the unlocked state. That is to say, when the control switch 3 continues to be in the abnormal state for a certain time period (6 seconds), the tilting mechanism 1 operates in the unlocked state such that it is convenient for the user to bring the vehicle to other places to seek assistance.

It should be noted that steps S707 and S708 are not implemented in any specific order and may be implemented at the same time.

In step S709, the controller 4 turns off the warning light 5.

In step S710, the controller 4 is configured to transmit the control signal to the tilting mechanism 1 for making the tilting mechanism 1 operate in the unlocked state when the unlocking switch portion 32 of the control 3 is pressed.

In step S711, the controller 4 controls the warning sound element 6 to stop generating the warning sound.

It should be noted that steps S709 to S711 are not implemented in any specific order and may be implemented at the same time.

Besides the situation where the control switch 3 is abnormal and continues to transmit the operation signal, the controller 4 also needs to control the transmission of the control signal in the situations described below.

When the controller 4 determines that the engine speed is smaller than 900 rpm, which means that the engine has yet to be started with successful ignition and the user may be parking, walking, or fixing the vehicle, the controller 4 is configured to transmit the control signal to the tilting mechanism 1 to make the tilting mechanism 1 operate in one of the locked state and the unlocked state when the control switch 3 is pressed.

When the engine speed is in a range of from 900 rpm to 3000 rpm, the vehicle is usually under various driving states. When the controller 4 determines that the engine speed is less than 2000 rpm and the vehicle speed is smaller than 10 km/h, which means that, for example, the user is driving the vehicle slowly or is slowing the vehicle down to a stop, the controller 4 is configured to transmit the control signal to the tilting mechanism 1 for making the tilting mechanism 1 operate in one of the locked state and the unlocked state when the control switch 3 is pressed. When the controller 4 determines that the engine speed is greater than 2200 rpm and the vehicle speed is greater than 2 km/h, which means that, for example, the vehicle is accelerating when the traffic light turns green, the controller 4 automatically transmits the control signal to the tilting mechanism 1 for making the tilting mechanism 1 operate in the unlocked state such that the user can make the vehicle start moving smoothly.

When the controller 4 determines that the engine speed is greater than 3000 rpm, which means that the vehicle has reached a certain speed, the controller 4 automatically transmits the control signal to the tilting mechanism 1 for making the tilting mechanism 1 operate in the unlocked state, and does not transmit the control signal that is for making the tilting mechanism 1 operate in the locked state when the locking switch portion 31 of the control switch 3 is pressed, which improves the driving safety.

Figure 8:
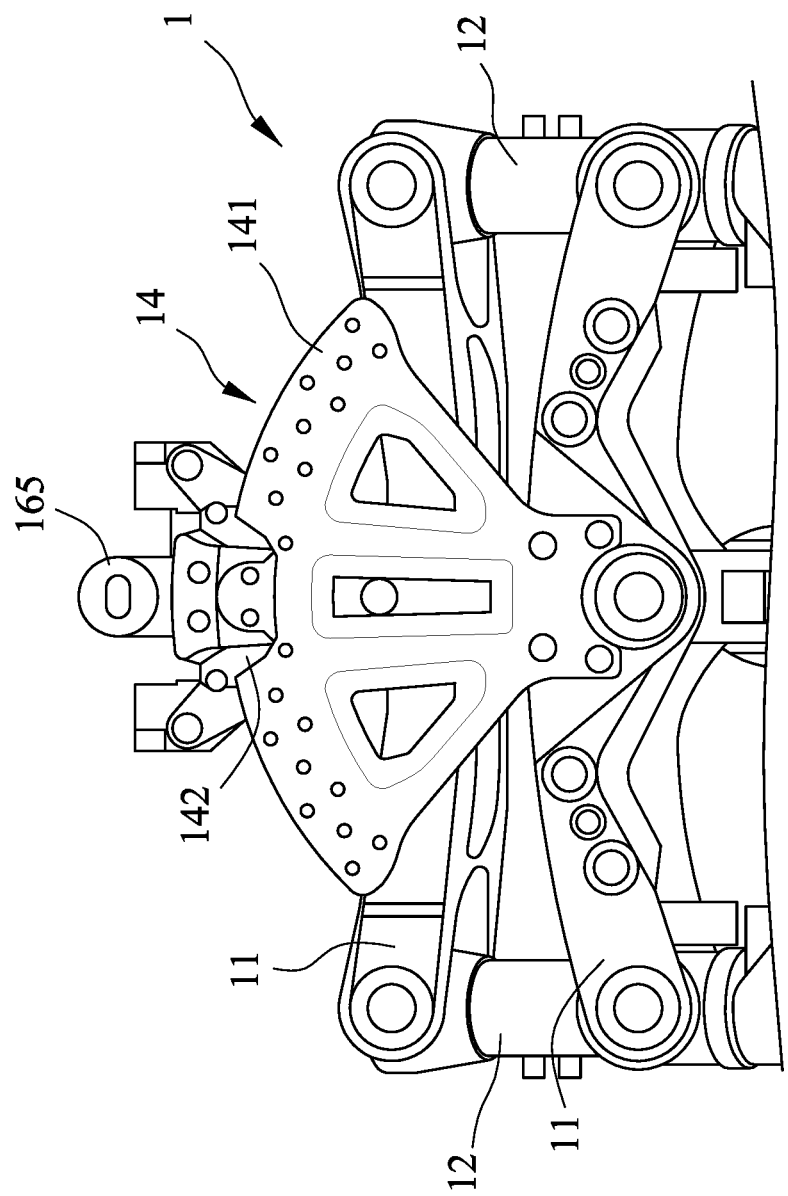
FIG. 8 is a side view illustrating a tilting mechanism of a vehicle according to another embodiment of the disclosure.
Figure 9:
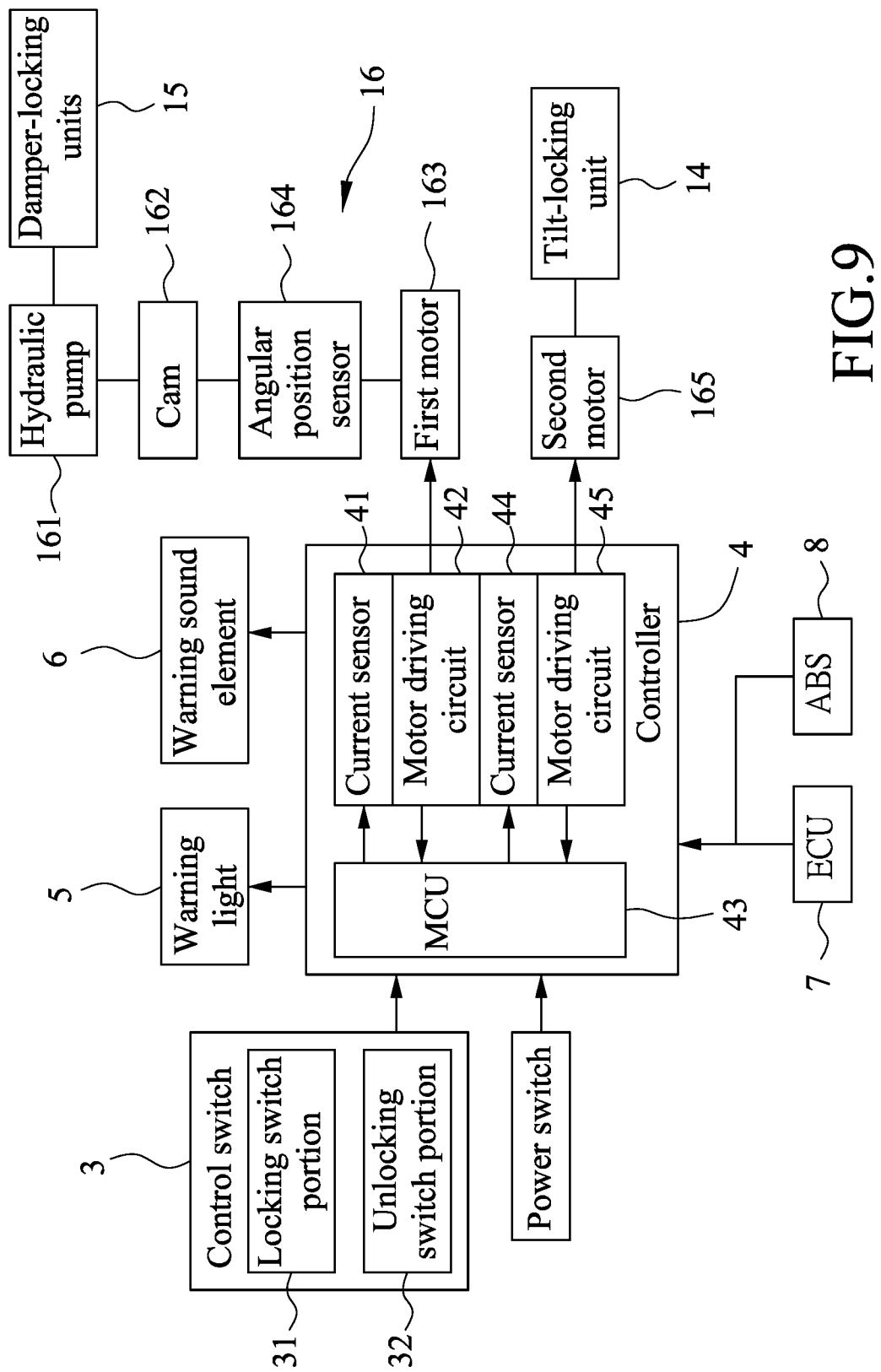
FIG. 9 is a block diagram illustrating components of the vehicle according to another embodiment of the disclosure.

FIGS. 8 and 9 illustrate a vehicle according to a second embodiment of the disclosure. The vehicle of this embodiment is similar to the vehicle according to the first embodiment of the disclosure, and only the differences between the first and second embodiments are described in the following paragraphs for the sake of brevity.

In the second embodiment, the hydraulic pump 161 of the driving mechanism 16 is configured to drive only the damper-locking units 15. Besides the motor 163 that is configured to drive the cam 162 (hereinafter referred to as "first motor"), the driving mechanism 16 of the second embodiment further includes a second motor 165 that is connected to the tilt-locking unit 14 and that is electrically connected to the controller 4 for receiving the control signal from the controller 4 to control the tilt-locking unit 14. In the second embodiment, the controller 4 includes two current sensors 41, 44 and two motor driving circuits 42, 45. One of the current sensors 41 is configured to detect the current value of electric current flowing through the first motor 163, and one of the motor driving circuits 42 is configured to control operation of the first motor 163. The other one of the current sensors 44 is configured to detect a current value of electric current flowing through the second motor 165, and the other one of the motor driving circuits 45 is configured to control operation of the second motor 165. The MCU 43 is configured to determine that the second motor 165 is stalled when the current value of the electric current flowing through the second motor 165 is greater than a threshold value.

The tilt-locking unit 14 of the tilting mechanism 1 includes a connecting component 141 (e.g., a disc) that is fastened to the transverse bars 11, and a clipping component 142 (e.g., a caliper) that is driven by the second motor 165 to clip the connecting component 141 for restricting the movement of the lateral bars 12 with respect to the transverse bars 11, so as to lock the tilting mechanism 1. The connecting component 141 has a bottom end pivotally connected to a lower one of the transverse bars 11 that is below an upper one of the transverse bars 11, and is slidably connected to the upper one of the transverse bars 11 (i.e., the upper one of the transverse bars 11 can move with respect to the connecting component 141 in the vertical direction). Accordingly, when the clipping component 142 does not clip the connecting component 141, the connecting component 141 can swing left and right with the bottom end as a fulcrum such that the movement of the lateral bars 12 with respect to the transverse bars 11 is allowed. When the second motor 165 drives a gear (not shown) to make the clipping component 142 clip a top part of the connecting component 141, this significantly reduces the degrees of freedom of the connecting component 141 such that the movement of the lateral bars 12 is restricted. The second embodiment provides the vehicle with greater design flexibility and versatility.

To sum up, according to the disclosure, when the vehicle detects that the control switch 3 is continuously transmitting the operation signal, which means that the control switch 3 may have failed, the controller 4 stops transmitting the control signal so as to reduce the chances of occurrence of accidents. Furthermore, the vehicle automatically controls the transmission of the control signal according to the engine speed and the vehicle speed, so driving safety is improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vehicle comprising:
   a tilting mechanism;
   two front wheels that are on two lateral sides of said tilting mechanism and that are spaced apart from each other in a lateral direction of said vehicle, said tilting mechanism being configured to allow said two front wheels to tilt;
   a control switch that is operable to generate an operation signal;
   a warning unit; and
   a controller that is electrically connected to said control switch to receive the operation signal therefrom, that is electrically connected to said tilting mechanism and said warning unit to control operations thereof, and that is configured to, in response to receipt of the operation signal, transmit a control signal to said tilting mechanism for making said tilting mechanism operate in one of an unlocked state and a locked state,
   wherein, after said vehicle is powered on, said controller is further configured to, when said controller has continuously received the operation signal for a predetermined reception time period, determine that said control switch is abnormal, stop transmitting the control signal to said tilting mechanism and control said warning unit to output a warning signal,
   wherein said tilting mechanism includes
      two transverse bars that are spaced apart from each other in an up-down direction of said vehicle,
      two lateral bars that are spaced apart from each other in a left-right direction of said vehicle and that are pivotally connected to said transverse bars,
      two dampers that are respectively connected to said lateral bars, said front wheels being mounted respectively on said dampers,
      a tilt-locking unit that is connected to said transverse bars and that is configured to be driven to allow or restrict movement of said lateral bars with respect to said transverse bars,
      two damper-locking units that are mounted respectively on said dampers and that are configured to be driven to respectively lock or unlock said dampers, and
      a driving mechanism that is electrically connected to said controller for receiving the control signal therefrom, and that is configured to, in response to receipt of the control signal from said controller, drive said tilt-locking unit and said damper-locking units,
   wherein said driving mechanism includes a hydraulic pump that is configured to drive said tilt-locking unit and said damper-locking units, a cam that is configured to be driven to drive said hydraulic pump, and a motor that is connected to said cam and that is electrically connected to said controller for receiving the control signal from said controller to drive said cam.

2. The vehicle of claim 1, wherein said warning unit includes a warning light, and said controller is configured to turn on said warning light to emit light as the warning signal when said controller has continuously received the operation signal for the predetermined reception time period.

3. The vehicle of claim 2, wherein, after determining that said control switch is abnormal, said controller is further configured to determine that said control switch has returned to normal and turn off said warning light when said controller has not received the operation signal for a predetermined idle time period.

4. The vehicle of claim 2, wherein said warning unit further includes a warning sound element,
   wherein, when the control signal is to make said tilting mechanism operate in the unlocked state, said controller is further configured to control said warning sound element to generate a warning sound as the warning signal for a predetermined actuation time period when said controller has continuously received the operation signal for the predetermined reception time period,
   wherein, while the warning sound is being generated, said controller is configured to control said warning sound element to stop generating the warning sound when said controller determines that said control switch has returned to normal,
   wherein, when said warning sound element has generated the warning sound for the predetermined actuation time period and said controller determines that said control switch remains abnormal, said controller is configured to transmit the control signal to said tilting mechanism for making said tilting mechanism operate in the unlocked state.

5. The vehicle of claim 1, further comprising:
   an engine control unit that is electrically connected to said controller to transmit an engine speed to said controller; and
   an anti-lock braking system that is electrically connected to said controller to transmit a vehicle speed to said controller,
   wherein, when the engine speed is greater than 2200 rpm and the vehicle speed is greater than 2 km/h, said controller is configured to transmit the control signal to said tilting mechanism for making said tilting mechanism operate in the unlocked state.

6. The vehicle of claim 1, further comprising an engine control unit that is electrically connected to said controller to transmit an engine speed to said controller,
   wherein, when the engine speed is greater than 3000 rpm, said controller is configured to transmit the control signal to said tilting mechanism for making said tilting mechanism operate in the unlocked state.

7. The vehicle of claim 1, further comprising an engine control unit that is electrically connected to said controller to transmit an engine speed to said controller,
   wherein, when the control signal is to make said tilting mechanism operate in the locked state and the engine speed is greater than 3000 rpm, said controller is configured to stop transmitting the control signal.

8. A vehicle comprising:
   a tilting mechanism;
   two front wheels that are on two lateral sides of said tilting mechanism and that are spaced apart from each other in a lateral direction of said vehicle, said tilting mechanism being configured to allow said two front wheels to tilt;
   a control switch that is operable to generate an operation signal;
   a warning unit; and
   a controller that is electrically connected to said control switch to receive the operation signal therefrom, that is electrically connected to said tilting mechanism and said warning unit to control operations thereof, and that is configured to, in response to receipt of the operation signal, transmit a control signal to said tilting mechanism for making said tilting mechanism operate in one of an unlocked state and a locked state,
   wherein, after said vehicle is powered on, said controller is further configured to, when said controller has continuously received the operation signal for a predetermined reception time period, determine that said control switch is abnormal, stop transmitting the control signal to said tilting mechanism and control said warning unit to output a warning signal,
   wherein said tilting mechanism includes
      two transverse bars that are spaced apart from each other in an up-down direction of said vehicle,
      two lateral bars that are spaced apart from each other in a left-right direction of said vehicle and that are pivotally connected to said transverse bars,
      two dampers that are respectively connected to said lateral bars, said front wheels being mounted respectively on said dampers,
      a tilt-locking unit that is connected to said transverse bars and that is configured to be driven to allow or restrict movement of said lateral bars with respect to said transverse bars,
      two damper-locking units that are mounted respectively on said dampers and that are configured to be driven to respectively lock or unlock said dampers, and
      a driving mechanism that is electrically connected to said controller for receiving the control signal therefrom, and that is configured to, in response to receipt of the control signal from said controller, drive said tilt-locking unit and said damper-locking units,
   wherein said driving mechanism includes a hydraulic pump that is configured to drive said damper-locking units, a cam that is configured to be driven to drive said hydraulic pump, a first motor that is connected to said cam and that is electrically connected to said controller for receiving the control signal from said controller to drive said cam, and a second motor that is connected to said tilt-locking unit and that is electrically connected to said controller for receiving the control signal from said controller to control said tilt-locking unit.

9. The vehicle of claim 8, wherein said tilt-locking unit includes a connecting component that is fastened to said transverse bars, and a clipping component that is driven by said second motor to clip said connecting component for restricting the movement of said lateral bars with respect to said transverse bars.

10. The vehicle of claim 1, wherein said control switch is a push switch and includes an unlocking switch portion and a locking switch portion,
    wherein said control switch is configured to generate an unlocking signal as the operation signal when said unlocking switch portion is pressed, and said controller is configured, in response to receipt of the unlocking signal, to transmit the control signal to said tilting mechanism for making said tilting mechanism operate in the unlocked state,
    wherein said control switch is configured to generate a locking signal as the operation signal when said locking switch portion is pressed, and said controller is configured, in response to receipt of the locking signal, to transmit the control signal to said tilting mechanism for making said tilting mechanism operate in the locked state.

11. The vehicle of claim 8, wherein said warning unit includes a warning light, and said controller is configured to turn on said warning light to emit light as the warning signal when said controller has continuously received the operation signal for the predetermined reception time period.

12. The vehicle of claim 11, wherein, after determining that said control switch is abnormal, said controller is further configured to determine that said control switch has returned to normal and turn off said warning light when said controller has not received the operation signal for a predetermined idle time period.

13. The vehicle of claim 11, wherein said warning unit further includes a warning sound element,
   wherein, when the control signal is to make said tilting mechanism operate in the unlocked state, said controller is further configured to control said warning sound element to generate a warning sound as the warning signal for a predetermined actuation time period when said controller has continuously received the operation signal for the predetermined reception time period,
   wherein, while the warning sound is being generated, said controller is configured to control said warning sound element to stop generating the warning sound when said controller determines that said control switch has returned to normal,
   wherein, when said warning sound element has generated the warning sound for the predetermined actuation time period and said controller determines that said control switch remains abnormal, said controller is configured to transmit the control signal to said tilting mechanism for making said tilting mechanism operate in the unlocked state.

14. The vehicle of claim 8, further comprising:
   an engine control unit that is electrically connected to said controller to transmit an engine speed to said controller; and
   an anti-lock braking system that is electrically connected to said controller to transmit a vehicle speed to said controller,
   wherein, when the engine speed is greater than 2200 rpm and the vehicle speed is greater than 2 km/h, said controller is configured to transmit the control signal to said tilting mechanism for making said tilting mechanism operate in the unlocked state.

15. The vehicle of claim 8, further comprising an engine control unit that is electrically connected to said controller to transmit an engine speed to said controller,
   wherein, when the engine speed is greater than 3000 rpm, said controller is configured to transmit the control signal to said tilting mechanism for making said tilting mechanism operate in the unlocked state.

16. The vehicle of claim 8, further comprising an engine control unit that is electrically connected to said controller to transmit an engine speed to said controller,
   wherein, when the control signal is to make said tilting mechanism operate in the locked state and the engine speed is greater than 3000 rpm, said controller is configured to stop transmitting the control signal.

17. The vehicle of claim 8, wherein said control switch is a push switch and includes an unlocking switch portion and a locking switch portion,
   wherein said control switch is configured to generate an unlocking signal as the operation signal when said unlocking switch portion is pressed, and said controller is configured, in response to receipt of the unlocking signal, to transmit the control signal to said tilting mechanism for making said tilting mechanism operate in the unlocked state,
   wherein said control switch is configured to generate a locking signal as the operation signal when said locking switch portion is pressed, and said controller is configured, in response to receipt of the locking signal, to transmit the control signal to said tilting mechanism for making said tilting mechanism operate in the locked state.

* * * * *